United States Patent [19]
Tschirner et al.

[11] Patent Number: 5,880,239
[45] Date of Patent: Mar. 9, 1999

[54] FUSIBLE CHLORINE-FREE VINYL ACETATE COPOLYMER FIBRES

[75] Inventors: Peter Tschirner; Johannes Kinkel, both of Emmerting; Dieter Gorzel, Burghausen, all of Germany

[73] Assignee: Wacker-Chemie GmbH, Munich, Germany

[21] Appl. No.: 913,028

[22] PCT Filed: Jun. 5, 1996

[86] PCT No.: PCT/EP96/02449

§ 371 Date: Sep. 5, 1997

§ 102(e) Date: Sep. 5, 1997

[87] PCT Pub. No.: WO96/41907

PCT Pub. Date: Dec. 27, 1996

[30] Foreign Application Priority Data

Jun. 8, 1995 [DE] Germany .................. 195 20 990.7

[51] Int. Cl.⁶ .................................................. C08F 22/26
[52] U.S. Cl. ................... 526/323; 526/323.1; 526/323.2
[58] Field of Search ................... 526/323, 323.1, 526/323.2

[56] References Cited

U.S. PATENT DOCUMENTS

| 621,389 | 8/1949 | Dickey | 526/323 |
|---|---|---|---|
| 2,354,744 | 8/1944 | Dreyfus . | |
| 3,714,096 | 1/1973 | Biale | 526/323 |
| 4,826,938 | 5/1989 | Mudge | 526/323.1 |
| 4,829,139 | 5/1989 | Mudge | 526/323.1 |
| 5,276,084 | 1/1994 | Cheng et al. | 526/307.5 |
| 5,525,656 | 6/1996 | Heiling et al. . | |

FOREIGN PATENT DOCUMENTS

| 2379761 | 3/1979 | Germany | 526/323 |
|---|---|---|---|
| 513221 | 10/1939 | United Kingdom | 526/323 |
| 2239250 | 6/1991 | United Kingdom | 526/320 |

OTHER PUBLICATIONS

Hawley's Condensed Chemical Dictionary, Sax et al Feb. 91 p. 371.

*Primary Examiner*—Bernard Lipman
*Assistant Examiner*—N. Sarofim
*Attorney, Agent, or Firm*—Burgess, Ryan & Wayne

[57] ABSTRACT

Fusible vinyl acetate copolymer fibers based on vinyl acetate copolymers are provided and contain (a) at least 40.0% by weight of vinyl acetate units; (b) 15.0 to 50.0% by weight of monomer units that consist of one or several chlorine-free, ethylenically unsaturated monomer units that consist of one or several ethylenically unsaturated monomers whose homopolymers have a glass transition temperature Tg from −100° to 0° C.

10 Claims, No Drawings

FUSIBLE CHLORINE-FREE VINYL ACETATE COPOLYMER FIBRES

BACKGROUND OF THE INVENTION

1. Field of the Invention

The invention relates to fusible chlorine-free vinyl acetate copolymer fibres, to processes for their production and to their use as fibrous binders.

2. Background Art

To increase the resistance to mechanical load, fibrous structures, for example nonwoven fabrics, are bonded with binders. These binders can be employed in the form of solids, such as powders or fibres, or as liquids, in the form of solutions or dispersions. Fibrous binders have a number of advantages over aqueous binder dispersions. Bonding nonwovens by means of aqueous dispersions requires a special application machine and a drying unit for removing the aqueous phase from the dispersion. In addition to the expenditure on apparatus, the removal of water is also very expensive in terms of energy. In contrast, fibrous binders can be processed on the customary devices for production of textile sheet-like structures together with the fibres to be bonded. For example, the binder fibres can be laid out together with the fibres to be bonded, and the fibre material can be bonded with a far lower energy consumption by heating to the melting point of the binder fibres.

Conventional melt-fusible fibres which are employed for bonding textile sheet-like structures are, for example, polyolefins, such as polyethylene or polypropylene fibres, or polyesters, such as polyethylene terephthalate fibres. Nevertheless, these fibres have the disadvantage that their melt viscosity changes dramatically within a narrow temperature range. During processing of these fibres, the temperature and residence time during thermal bonding must be adhered to very precisely, since even small variations in temperature can cause the molten fibrous binder to run-off.

A wider temperature range for processing is available with copolymer fibres (CP fibres) based on vinyl acetate/vinyl chloride copolymer fibres. A disadvantage of these fibres is the high chlorine content, which leads to problems during disposal and re-use of textiles bonded therewith.

The object was therefore to provide a fusible thermoplastic fibre which has the same melting characteristics as the CP fibres but does not contain any chlorine. In addition, it should be possible to melt-spin the polymer, in order to bypass the disposal problems of polymers which can be spun only in solution.

SUMMARY OF THE INVENTION

The invention relates to fusible vinyl acetate copolymer fibres based on vinyl acetate copolymers comprising a) at least 40.0% by weight of vinyl acetate units,
b) 15.0 to 50.0% by weight of monomer units of one or more chlorine-free, ethylenically unsaturated monomers whose homopolymers have a glass transition temperature Tg of 40° to 120° C., and
c) 0.1 to 15.0% by weight of monomer units of one or more ethylenically unsaturated monomers whose homopolymers have a glass transition temperature Tg of −100° to 0° C.

DESCRIPTION OF THE PREFERRED EMBODIMENTS

Preferably, the vinyl acetate copolymers comprise 60 to 70% by weight of vinyl acetate, 15 to 25% by weight of one or more monomers b) and 3 to 10% by weight of one or more monomers c). To obtain an optimum melt viscosity, vinyl acetate copolymers of which the molecular weight corresponds to a Fikentscher K value (1% strength solution in tetrahydrofuran/water 93:7 (V/V) determined in accordance with DIN 53726) of 30 to 80 are preferred.

Preferred comonomers b) are vinyl esters of saturated aliphatic monocarboxylic acids having 5 to 9 C atoms which contain a quaternary C atom in the α-position relative to the carboxyl group, for example VeoVa5$^R$ or VeoVa9$^R$ or dimethyl fumarate, di-isopropyl fumarate, di-t-butyl fumarate, methyl t-butyl fumarate, dimethyl maleate, di-isopropyl maleate, di-t-butyl maleate, methyl t-butyl maleate, 4-t-butyl-cyclohexyl acrylate, t-butyl acrylate, methyl methacrylate or N-vinylpyrrolidone. Diisopropyl fumarate is particularly preferred as co-monomer b).

Preferred comonomers c) are vinyl laurate, dibutyl maleate, di-2-ethylhexyl maleate, dibutyl fumarate, di-2-ethylhexyl fumarate, ethylene and vinyl esters of saturated aliphatic monocarboxylic acids having 10 C atoms which contain a quaternary C atom in the α-position relative to the carboxyl group (VeoVa10$^R$), a registered trademark of the Shell Corporation. Particularly preferred comonomers c) are dibutyl maleate, di-2-ethylhexyl maleate and ethylene.

The softening range of the vinyl acetate copolymer fibres according to the invention is preferably between 60° and 150° C., particularly preferably 80° to 120° C. The linear density of the fibres is preferably between 3 and 25 dtex. The ranges of 3 to 6 dtex and 17 to 25 dtex are particularly preferred. The tenacities are preferably 5 to 10 cN/tex. The fibre length can be adjusted as desired. Fibre lengths of 4–10 mm are preferred for bonding paper, and fibre lengths of 40–70 mm are preferred for bonding textiles.

The invention furthermore relates to a process for the production of fusible vinyl acetate copolymer fibres by means of A) free radical polymerization, in an organic solvent or in aqueous suspension, of a comonomer composition comprising at least 40.0% by weight of vinyl acetate, 15.0 to 50.0% by weight of one or more chlorine-free, ethylenically unsaturated monomers whose homopolymers have a glass transition temperature Tg of 40° to 120° C., and 0.1 to 15.0% by weight of one or more ethylenically unsaturated monomers whose homopolymers have a glass transition temperature Tg of −100° to 0° C., B) isolation of the vinyl acetate copolymers by precipitation, filtration with suction or removal of the liquid phase by distillation and drying, and C) spinning the vinyl acetate copolymer from the solution or the melt.

Protective colloids which can be employed successfully in the suspension polymerization are, inter alia, polyvinylpyrrolidone, polyvinyl alcohol, cellulose derivatives, such as hydroxyethylcellulose, vinyl ester copolymers containing carboxylic acid, and also inorganic distributors such as aluminium hydroxide or magnesium hydroxide. The amount of protective colloid employed is preferably between 0.05 and 3.0% by weight, based on the amount of comonomer. If appropriate, small amounts of emulsifier can also be added during the suspension polymerization. Alkyl sulphates and alkylsulphonates in amounts of preferably 0.001 to 1.0% by weight, based on the amount of comonomer, have proved to be particularly appropriate.

The polymerization can be carried out by the initial mixture process or by the feed process, it being possible for the feed to have the same composition as, or a different composition from, any initial mixture present.

Initiators which are employed for the suspension and solution polymerization are the customary organic peroxides and azo compounds, such as dibutyl peroxydicarbonate, bis(4-tert-butylcyclohexyl) peroxydicarbonate, bis(2-ethylhexyl) peroxydicarbonate, dicetyl peroxydicarbonate, tert-butyl peroxypivalate, dilauryl peroxide, dibenzoyl peroxide, dicumyl peroxide, tert-butyl peroxy-2-ethylhexanoate, 2,2-bis(tert-butylperoxy)butane, tert-butyl hydroperoxide, dicyclohexyl peroxydicarbonate and 2,2'-azoiso-butyronitrile.

One initiator alone or a mixture of different initiators can be used for the polymerization. For the suspension polymerization, it has proved appropriate to use a combination of initiators having different decomposition temperatures (different half-times at the given polymerization temperature), since a faster and more continuous polymerization reaction is achieved in this way. For the suspension polymerization, the initiator or initiators are as a rule introduced into the reaction vessel with the initial mixture, since the organic initiators used diffuse into the beads via the aqueous phase only with difficulty. For the polymerization in an organic solvent, it is in general ore appropriate for only a portion of the initiator or initiators to be initially introduced into the reaction vessel and for the remainder to be metered in during the course of the reaction. Furthermore, it is often advantageous to add reducing compounds, such as tertiary aromatic amines, or ascorbic acid in addition to the initiators. The initiators are as a rule employed in amounts of between 0.01 and 1.0% by weight, based on the sum of the monomers. The polymerization temperature is between 30° and 95° C., depending on whether a purely thermal system or a redox system is used. Towards the end of the polymerization, the temperature is in general adjusted to a higher temperature than the initial polymerization temperature in order to bring the reaction to completion.

The molecular weight is controlled in the manner known to the expert: for the solution polymerization, by the choice of a solvent of suitable transfer constant. For the suspension polymerization, the molecular weight can be controlled by addition of regulators, such as dodecyl mercaptan, mercaptoethanol or acetaldehyde. The regulators are preferably employed in amounts of 0.01 to 1.0% by weight, based on the amount of comonomers.

The vinyl acetate copolymers are isolated in the customary manner: for the suspension polymerization, by filtration with suction and washing with water and subsequent-drying. If the polymerization is carried out in an organic solvent, the copolymer can be isolated by precipitation in a precipitating agent, such as, for example, methanol or petroleum spirits, in which case the volume ratio of precipitating agent to solution should be at least 5:1. The polymer can also be isolated by distilling off the solvent.

The vinyl acetate copolymer in the form of powder or granules can be spun into fibres by conventional spinning processes. A list and description of known spinning processes is to be found, for example, in Ullmanns Encyclopädie der technischen Chemie 4th Edition, Volume 11, page 249 et seq (1976). The production of the fibres can in principle be carried out both by the solution spinning process and by the melt spinning process. The melt spinning process is preferred.

For spinning by the melt spinning process, the vinyl acetate copolymer is preferably melted in a melt extruder which has one or more screws and is equipped with a heating device. The melting temperature is in general up to 240° C., preferably 180° to 200° C., and if appropriate a temperature gradient can also be set up. The melt is pumped into the spinneret(s) under a pressure of preferably 50 to 100 bar. Preferably, the melt is pumped into a manifold feeding a plurality of spinnerets, the fibre thickness being controlled via hole diameter and take-off speed.

After extrusion, the fibre can be stretched while hot in conventional stretching units with multiple rolls. For production of staple fibres, the fibres can be cut to the desired length, for example with a cutting wheel. Continuous fibres can be crimped by means of known devices.

The vinyl acetate copolymer fibres according to the invention are suitable in particular as a fibrous binder for bonding naturally occurring or synthetic fibre materials. Examples of these are wood fibre, cellulose fibre, wool, cotton, mineral fibres, ceramic fibres, synthetic fibres based on fibre-forming polymers, such as viscose fibre or polyethylene, polypropylene, polyester, polyamide, polyacrylonitrile or carbon fibre, or fibres of homo- or copolymers of tetrafluoroethylene.

Before the bonding, the fibres to be bonded are spread out in sheet form. The processes for this are known and primarily depend on the use to which the bonded fibre material is put. The fibres can be laid out by means of an air laying, wet laying, direct spinning or carding device. If appropriate, the sheet-like structures can additionally be bonded mechanically, for example by crosslaying, needling or water jet bonding, before bonding with the fibrous binder.

For the use according to the invention, the fibrous binder is mixed in a manner known per se with the fibre to be bonded. Depending on the area of use, the amount of fibrous binder needed for bonding the fibre material is preferably 1 to 30% by weight, based on the weight of fibre to be bonded.

In a preferred embodiment, before the fibre material to be bonded is laid out, the vinyl acetate copolymer fibre is mixed with it in a fibre mixing apparatus and the fibre mixture is laid out. An embodiment in which the fibre material to be bonded and the vinyl acetate copolymer fibre are fed together into a carding device is also preferred.

For bonding of fibre materials based on polymer fibres, the vinyl acetate copolymer and the fibre polymer can be spun together by the direct spinning process and the fibre mixture obtained by this process can be laid out.

The fibre material is bonded by heating to a temperature of preferably 80° to 120° C., if appropriate under pressure. The heat treatment for bonding the fibre material is carried out by means of known devices; for example with heatable gelling drums, in a heated drying tunnel or by means of focused hot air jets (air through bonding).

The vinyl acetate copolymer fibre is particularly suitable for bonding lofty fibre materials, for example for the production of cushioning, insulating and filter waddings. Another preferred field of use for the vinyl acetate copolymer fibre is its use for rendering nonwovens heat-sealable, for example teabag paper or heat-sealable waddings.

The use of the vinyl acetate copolymer fibre for the production of needlefelt is also preferred. In the prior art, especially aqueous dispersions based on styrene/butadiene rubber, ethylene/vinyl acetate copolymers and ethylene/vinyl acetate/vinyl chloride copolymers are employed for the coating. The dispersions are applied to the fibrous structure bonded by needling and are converted into a film in a hot calender. When the vinyl acetate copolymer fibre is used, the dryer output to be expended and therefore the energy requirement needed for the production are reduced considerably. The need for a separate unit for application of the binder is eliminated.

In summary, the advantage of the use of the vinyl acetate copolymer fibre in applications where aqueous systems are traditionally employed, for example bonding nonwovens, lies in a significant reduction in the outlay on drying and in the amounts of wastewater. In contrast to the use of aqueous binder dispersions, there are no binder losses as with spraying or application of aqueous dispersions. Furthermore, there is no need for a separate device for application of the binder.

Another advantage of the novel fibre relative to the behaviour of conventional, thermoplastic-based fibres is that the melt viscosity remains virtually constant over a wide temperature range. Fluctuations in temperature during processing are thus less serious than in the processing of conventional thermoplastic fibres.

The following Examples illustrate the invention:
Preparation of the vinyl acetate copolymers

EXAMPLE 1

194 litres of deionized water, 1.92 litres of 0.1% strength copper acetate solution and 7.66 kg of a 5% strength polyvinylpyrrolidone solution were initially introduced into a 500 l reactor with a blade stirrer, a reflux condenser, nitrogen flushing and metering devices. A mixture of 7.66 kg of vinyl acetate, 0.48 kg of diisopropyl fumarate, 0.48 kg of di-n-butyl maleate, 0.242 kg of dicyclohexyl peroxodicarbonate and 0.255 kg of tert-butyl perpivalate was added to this initial mixture at room temperature at a stirrer speed of 40 revolutions/minute. The reactor was then twice evacuated and filled with nitrogen.

The mixture was heated up to the reaction temperature of 55° C. and the stirrer speed was increased to 100 revolutions/minute. When the internal temperature was reached, the meterings were started. Metered component 1 was a mixture of 66.10 kg of vinyl acetate, 16.80 kg of diisopropyl fumarate and 4.31 kg of di-n-butyl maleate. Metered component 2 was a solution of 0.632 kg of sodium bicarbonate in 19.20 litres of deionized water. The two metered components were metered in at a constant metering rate over a period of 300 minutes. After the end of the metering, the internal temperature was kept at 55° C. for a further two hours and then increased to 70° C. for two hours. A vacuum was then applied at 70° C. for half an hour. After cooling to 25° C., the product was filtered off with suction on a suction filter and washed repeatedly with water. Drying was carried out in a fluidized bed dryer. The residual moisture after drying was 0.5%.

The resulting bead polymer had an average particle diameter of 0.2 mm and a K value of 63, the glass transition temperature (DSC) was 32° C. and the blocking point was 45° C.

EXAMPLE 2

194 litres of deionized water, 1.92 litres of a 0.1% strength copper acetate solution and 7.63 kg of a 5% strength polyvinylpyrrolidone solution were initially introduced into a 500 l reactor with a blade stirrer, a reflux condenser, nitrogen flushing and metering devices. A mixture of 6.67 kg of vinyl acetate, 0.95 kg of diisopropyl fumarate, 0.95 kg of di-n-butyl maleate, 0.242 kg of dicyclohexyl peroxodicarbonate and 0.255 kg of tert-butyl perpivalate was added to this initial mixture at room temperature at a stirrer speed of 40 revolutions/minute. The reactor was then twice evacuated and filled with nitrogen.

The mixture was heated up to the reaction temperature of 55° C. and the stirrer speed was increased to 100 revolutions/minute. When the internal temperature was reached, the meterings were started. Metered component 1 was a mixture of 58.10 kg of vinyl acetate and 22.90 kg of diisopropyl fumarate. Metering component 2 comprised 5.72 kg of di-n-butyl maleate. Metered component 3 was a solution of 0.629 kg of sodium bicarbonate in 19.10 litres of deionized water. Metered components 1 and 3 were metered in at a constant metering rate over a period of 300 minutes, while metered component 2 was metered in at a constant metering rate over a period of 180 minutes. After the end of the metering, the internal temperature was kept at 55° C. for a further two hours and then increased to 70° C. for two hours. A vacuum was then applied at 70° C. for half an hour. After cooling to 25° C., the product was filtered off with suction on a suction filter and washed repeatedly with water. Drying was carried out in a fluidized bed dryer. The residual moisture after drying was 1%.

The resulting bead polymer had an average particle diameter of 0.2 mm and a K value of 60, the glass transition temperature (DSC) was 41° C. and the blocking point was 50° C.

Production of the Vinyl Acetate Copolymer Fibre

The copolymer from Example 1 was melted in an extruder with 6 heating zones over a temperature gradient of 20° C. at the start of the screw to 180° C. at the end of the screw, and was conveyed via a filter of 5000 mesh/cm$^2$ into a spinning pump. The melt left the spinning pump under a melt pressure of 31 bar and was spun through a manifold with 6109 spinneret orifices of 0.4 mm diameter. The fibre strand was quenched a 30 mm wide gap with ambient air and cooled further over a roll wetted with water. The fibre was taken off via a stretching unit at a rate of 25 m/minute.

Fibre characteristics:

Softening range >60° C.; linear density=15.0 dtex; tenacity=8.0 cN/tex.

In a further experiment, the copolymer from Example 1 was melted in an extruder having 6 heating zones at a temperature gradient of 20° C. at the beginning of the screw to 180° C. at the screw end and was conveyed via a sieve assembly comprising a 100 $\mu$m sieve and a 10 $\mu$m sieve into a spinning pump. The melt left the spinning pump under a pressure of from 10 to 20 bar and was spun via a spinneret having an orifice diameter of 0.2 mm. The fibre strand was taken off via a takeoff roll and wound (takeoff rate >1000 m/min.). A fibre product similar to that described above was obtained.

We claim:

1. Fusible vinyl acetate copolymer fibres based on vinyl acetate copolymers comprising
   a) at least 40.0% by weight of vinyl acetate units,
   b) 15.0 to 50.0% by weight of monomer units of one or more chlorine-free, ethylenically unsaturated monomers whose homopolymers have a glass transition temperature Tg of 40° to 120° C., and
   c) 0.1 to 15.0% by weight of monomer units of one or more ethylenically unsaturated monomers whose homopolymers have a glass transition temperature Tg of −100° to 0° C.

2. A process for the production of fusible vinyl acetate copolymer fibres which comprises A) free radical polymerizing in a medium selected from the group consisting of an organic solvent and an aqueous suspension, of a comonomer composition comprising at least 40.0% by weight of vinyl acetate, 15.0 to 50.0% by weight of one or more chlorine-free, ethylenically unsaturated monomers whose homopolymers have a glass transition temperature Tg of 40° to 120° C., and 0.1 to 15.0% by weight of one or more ethylenically unsaturated monomers whose homopolymers have a glass transition temperature Tg of −100° to 0° C., B) isolating the vinyl acetate copolymers, drying, and C) spinning the vinyl acetate copolymer into fibres.

3. The process of claim 2 wherein in step B), the vinyl acetate copolymers are isolated by filtration.

4. The process of claim 2 wherein in step B), isolation of the vinyl acetate copolymers is by removal of the liquid phase by distillation.

5. A process for bonding fibres which comprises bonding the fibres with the vinyl acetate copolymer fibres of claim 1.

6. The process of claim 5 wherein the fibres being bonded are naturally occurring fibres.

7. The process of claim 5 wherein the fibres being bonded are synthetic fibres.

8. The bonded fibres produced by the process of claim 5.

9. The bonded fibres produced by the process of claim 6.

10. The bonded fibres produced by the process of claim 7.

* * * * *